No. 757,795. PATENTED APR. 19, 1904.
O. M. WALKER.
RAKE.
APPLICATION FILED FEB. 25, 1903.
NO MODEL.

Witnesses
Charles Morgan
Harry Ellis Chandler

Inventor
O. M. Walker
by
Chandler & Chandler
Attorneys

No. 757,795. Patented April 19, 1904.

UNITED STATES PATENT OFFICE.

OWEN M. WALKER, OF WILLOW, INDIANA.

RAKE.

SPECIFICATION forming part of Letters Patent No. 757,795, dated April 19, 1904.

Application filed February 25, 1903. Serial No. 144,944. (No model.)

*To all whom it may concern:*

Be it known that I, OWEN M. WALKER, a citizen of the United States, residing at Willow, in the county of Hancock, State of Indiana, have invented certain new and useful Improvements in Rakes; and I do hereby declare the following to be a full, clear, and exact description of the invention, such as will enable others skilled in the art to which it appertains to make and use the same.

This invention relates to rakes, and more particularly to that class wherein the head and handle are separable and with which head are removably engaged teeth, the object of the invention being to provide a cheap and simple construction of rake in which the teeth will be individually secured in the head and in which the handle will be secured to the head through the medium of certain of the teeth.

A further object of the invention is to provide a rake in which the head has a stiffening-flange which serves as a scraper and also protects the fastening means for the teeth.

Other objects and advantages of the invention will be understood from the following description.

Figure 1:
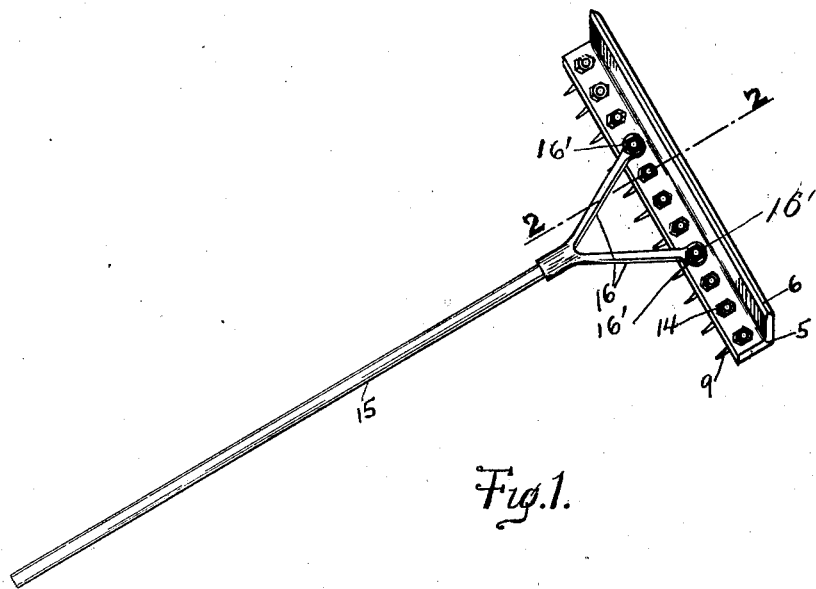
Figure 2:
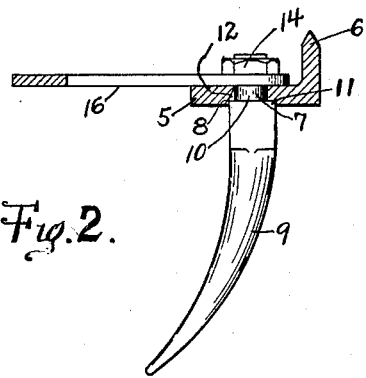

In the drawings forming a portion of this specification, and in which like numerals of reference indicate similar parts in the several views, Figure 1 is a perspective view showing a rake embodying the present invention. Fig. 2 is a transverse section through the head on line 2 2 of Fig. 1.

Referring now to the drawings, the present rake comprises a head 5, of steel, having an upwardly-directed and transversely-tapered flange 6 at its front edge, so that said head is in the form of an angle-bar, this flange serving not only to stiffen the head, but also as a scraper, as will hereinafter be more fully described. Through the head 5 are formed a longitudinal series of perforations 7, in a wall of each of which and adjacent to the lower face is formed a notch or socket 8.

In connection with the head of the rake is employed a series of teeth each including a downwardly-tapered arc-shaped blade 9 and an upper reduced and cylindrical stem 10. At the base of the stem of each tooth is a shoulder 11, and in the angle of the shoulder and stem is a web 12, extending longitudinally of the stem.

The stem of each tooth is a size to fit snugly in a perforation of the head of a rake, while the web 12 thereof engages the socket or recess 8 to hold the tooth against rotation and curved in a plane at right angles to the head. The free end portion of each of the stems of the teeth is threaded, and engaged therewith is a nut 14, which when screwed onto the stem after the latter is engaged with a perforation serves to draw the stem through the head and seat the lug firmly in its notch 8.

In connection with the head is employed a handle 15, having a forked shank 16, the stem of which is engaged in the handle and the extremities of the fork of which lie upon the upper face of the head 5 and have eyes 16', in which are received the elongated stems of two of the teeth of the rake, the retaining-nuts of these teeth being screwed down to impinge against the arms of the forked shank and clamp them firmly against the head of the rake. The clamping-nuts or retaining-nuts of these two teeth therefore serve the double function of holding the teeth and the head to the handle.

It will be noted that the flange 6 of the head projects upwardly beyond the free ends of the stems of the teeth, so that it protects the nuts in the operation of the rake, and loosening of the nuts by striking them is prevented.

When it is desired to use the rake as a scraper, it is reversed, so that the teeth project upwardly, and it will be understood that in practice modifications of the specific construction shown may be made and that any suitable materials and proportions may be used for the various parts without departing from the spirit of the invention.

What is claimed is—

A rake consisting of an angle-bar having perforations through one side thereof, teeth having reduced threaded stems engaged in and fitting their respective perforations, nuts engaged with the extremities of the stems and lying in the angle of the bar, and a handle having a forked shank and having perforations therethrough, said fork being engaged with the stems of certain of the teeth between the nuts and the angle-bar, the angle-bar at one side extending above the forked shank.

In testimony whereof I affix my signature in presence of two witnesses.

OWEN M. WALKER.

Witnesses:
FRED M. HAMMER,
J. WEAVER WALKER.